United States Patent
Yaoita

[11] 3,967,580
[45] July 6, 1976

[54] POINTER DEVICE FOR MEASURING APPARATUS

[75] Inventor: Isamu Yaoita, Kawasaki, Japan
[73] Assignee: Eiwa Denki Co., Ltd., Tokyo, Japan
[22] Filed: Sept. 19, 1974
[21] Appl. No.: 507,361

[52] U.S. Cl. ............................. 116/115; 116/136.5
[51] Int. Cl.² ................................................ G01D 7/00
[58] Field of Search ............... 116/115, 129 T, 129, 116/136.5; 324/154 PB; 73/432 A; 308/2 A, 2 R

[56] References Cited
UNITED STATES PATENTS

| | | | |
|---|---|---|---|
| 1,983,305 | 12/1934 | Paulin | 73/432 A |
| 2,062,461 | 12/1936 | Le Fevre | 116/129 R |
| 2,368,905 | 2/1945 | Wallace | 308/2 R |

FOREIGN PATENTS OR APPLICATIONS 1,098,243  7/1955  France ............................. 116/116

Primary Examiner—S. Clement Swisher
Assistant Examiner—Denis E. Corr
Attorney, Agent, or Firm—George B. Oujevolk

[57] ABSTRACT

A pointer device for a measuring apparatus, having a main needle connected to a rotary shaft adapted to rotate in response to an external change, a set of auxiliary needles connected to the rotary shaft and a pointer and adapted to convert the rotation of the rotary shaft into a rectilinear translation of the pointer, special fixed and movable bearings for rotatably supporting and connecting said needles, and a plane scale graduated in increments corresponding to the unit value of the rotational distance of the main needle.

2 Claims, 6 Drawing Figures

POINTER DEVICE FOR MEASURING APPARATUS

This invention relates to a measuring apparatus and, more particularly, to a novel pointer device for a measuring apparatus.

In general-purpose measuring devices such as electrical measuring instruments, pressure gauges, thermometers or the like, a given external change is converted into a rotation of a rotary shaft and the change of the angle of the aforementioned rotation is adapted to be indicated on a predetermined scale by the rotation of a pointer. However, since the pointer carries out a circular rotational movement about the rotary shaft, there is the possibility that the reading of the scale becomes inconvenient and inaccurate. In addition, with the above-mentioned construction, the measuring apparatus with multiple scales has the disadvantages that a scale disposed close to the rotary shaft is rather difficult to read due to its narrow scale divisions and therefore the reading error may become large in a measurement which requires high accuracy. In consideration of these inconveniences of general-purpose measuring devices, other devices of the type in which the pointer is adapted to be translated have been heretofore proposed. In such devices, however, since amplifiers for amplifying extremely weak external changes are needed, motors, etc. are incorporated therein, other power sources are required. As a result, they are not only expensive but also heavy in weight and volume, causing inconvenience to their manipulation.

The present invention contemplates to eliminate the aforementioned disadvantages of a conventional measuring apparatus.

It is, therefore, an object of the present invention to provide a pointer device for a measuring apparatus in which the scale is easy to read without error.

It is another object of the present invention to provide a pointer device for a measuring apparatus which is compact, light and inexpensive.

It is still another object of the present invention to provide a pointer device for a measuring device which can indicate an exact measured value on the scale even in the case of multiple scales.

It is a further object of the present invention to provide a pointer device for a measuring device which achieves a rectilinear translation of the pointer without using amplifiers, motors, etc.

Other objects, features and advantages of the present invention will be apparent from the following description taken in connection with the accompanying drawings wherein.

Now, the present invention will be fully described with reference to the drawings.

Figure 1:
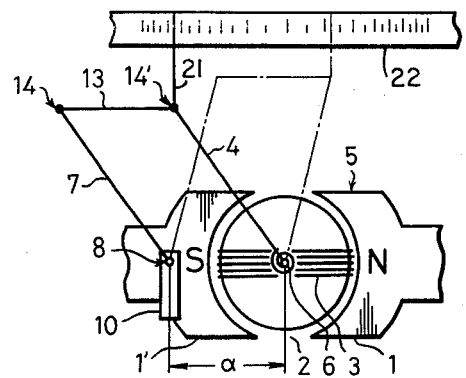
FIG. 1 is an explanatory plan view of a pointer apparatus according to this invention.

In an electrical measuring apparatus shown in FIG. 1 in which a given electric current to be measured (or an external change) is applied to a movable coil 3 disposed in a magnetic field 2 between magnetic poles 1 and 1' and a change of rotation angle of the movable coil 3 is indicated on a desired scale by a rotation of a main needle 4, a first auxiliary needle 7 having the same length as that of the main needle 4 fixed to a rotary shaft 6 of the movable coil 3 is rotatably supported by a fixed bearing 8 positioned at a certain distance $\alpha$ from the shaft 6.

Figure 2:
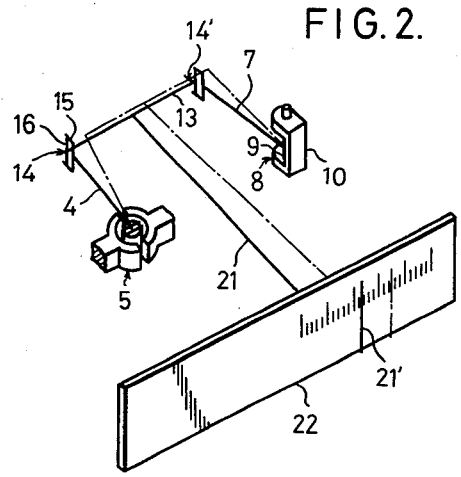
FIG. 2 is an explanatory perspective view of another embodiment of this invention.
Figure 3:
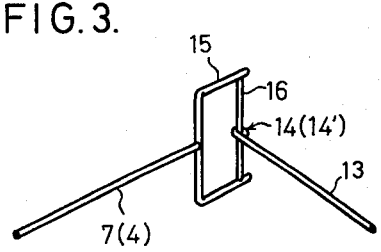
FIGS. 3 and 4 are enlarged explanatory sectional views of movable bearings of a main needle and an auxiliary needle, respectively.
Figure 5:
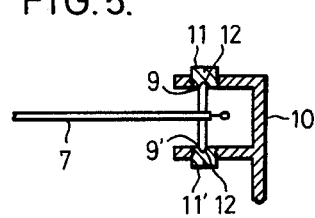
FIG. 5 is an enlarged explanatory sectional view showing an example of fixed bearings.

The fixed bearing 8 may be constructed, as shown in FIG. 5, so that the both pointed ends 9' of a slender shaft 9 fixed to the first auxiliary needle 7 may be fitted to pivot suspensions 12 of adjusting screws 11, 11' screwed into a bracket 10 to provide the slender shaft 9 with a low-resistance rotation. A second auxiliary needle 13 having the same length as the distance $\alpha$ is rotatably supported at both ends by movable bearings 14 and 14' mounted on the tips of the main needle 4 and the first auxiliary needle 7. As shown in FIG. 3, movable bearing 14 or 14' may be composed of a suspension frame 15 mounted on the tip of the main needle 4 or the first auxiliary needle 7, and an extremely-thin band 16 stretched at a right angle to the main needle 4 or the needle 7 between the upper and lower arms of the frame 15. The second auxiliary needle 13 fixed at both ends to the thin bands 16 of the movable bearings 14 and 14' is made rotatable by the twisting motion of the thin bands 16, as shown in FIG. 2.

Figure 4:
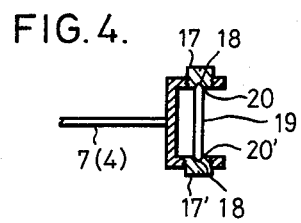

The fixed bearing 8 may be constructed by utilizing a thin band similar to the thin band 16 in the same manner as in the case of the movable bearing 14 or 14'. Moreover, the movable bearing 14 or 14' may be constructed in the manner similar to that of the fixed bearing 8 described with reference to FIG. 5 by utililizing a slender shaft 19 both pointed ends 20 and 20' which are rotatably fitted in pivot suspensions 18 of adjusting screws 17 and 17' as shown in FIG. 4, however, such construction is hard to put into practical use because it is difficult to manufacture.

Figure 6:
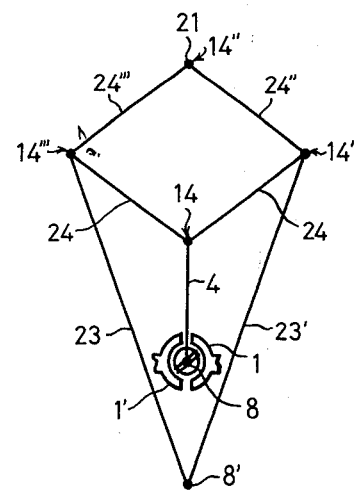
FIG. 6 is an explanatory view illustrating another principle which converts a rotational movement of a main needle into a rectilinear translational movement of a pointer.

A pointer 21 extended in the direction of the translational movement of the second auxiliary needle 13 is fixed to the second auxiliary needle 13 to provide the indication of a plane scale 22. The plane scale 22 has scale divisions corresponding to the unit value of the rotational distance of the main needle 4. The rectilinear translational movement of the pointer 21 is made possible, as mentioned above, by making the length of the second auxialiary needle 13 equal to the discance $\alpha$. However, the object of the present invention can be achieved even if the length of the second auxiliary needle 13 is shorter than the distance $\alpha$. In this case, the pointer 21 fixed to the second auxiliary needle 13 tends to incline with respect to the scale 22 and, therefore, a bent portion 21' is provided at the end of the pointer 21 as shown in FIG. 2. Thus the bent portion 21' can move in a substantially rectilinear translate along the scale 22 to precisely indicate a measured value on the scale. In addition, the translational movement of the pointer 21 can be also achieved by utilizing a Peaucellier's mechanism shown in FIG. 6 which has a main needle 4 supported at one end by the rotary shaft on a fixed bearing 8 and at the other end thereof to a movable bearing 14, a pair of long auxiliary needles 23 and 23' are fixed at one ends to a fixed bearing 8' and at the other ends to movable bearings 14' and 14''', also, short auxiliary needles 24, 24', 24'' and 24''' of the same length are connected together in a parallelogram shape through movable bearings 14, 14', 14'' and 14''' as shown, and a pointer 21 projected in the axial direction of the movable bearing 14'' is situated at an vertex of the parallelogram.

With the construction mentioned above, the pointer device according to the present invention is operated as follows:

The movable coil 3 is rotated through an angle corresponding to the strength of an electric current (external change) to be measured which is applied to the coil. Accordingly, the rotation of the rotary shaft 6 of the coil is transmitted through the main needle 4, auxiliary needles 7 and 13 or 23, 23', 24, 24', 24'' and 24''' to the pointer 21 to provide the rectilinear translational movement of the pointer 21 thereby indicating a measured value on the scale 22.

The aforementioned embodiment was described with respect to an electrical measuring apparatus, but this invention can be applied to any other desired measuring apparatus.

As mentioned above, the pointer device according to the present invention for use in a measuring apparatus adapted to convert an external change into a rotation of a rotary shaft therein and to indicate on a scale a change of the rotational angle of the rotary shaft by means of a pointer connected to the rotary shaft, is characterized in that the rotation of a main needle directly connected to the rotary shaft is converted into a rectilinear translation of the pointer by the combination of auxiliary needles and the main needle and in that it comprises fixed bearings each including either a slender shaft fitted into pivot suspensions or a twistable extremely-thin band stretched therein to provide rotation to a needle connected thereto, and movable bearings between auxiliary needles or between an auxiliary needle and the main needle and each including either a twistable extremely-thin band stretched therein. Therefore, the resistance due to the movable and fixed bearings is considered as substantially negligible. Accordingly, the pointer device according to the present invention can precisely transmit the unit value of the rotational distance of the main needle to the pointer, which can in turn precisely indicate on the scale a value corresponding to the unit value of the rotational distance of the main needle without error. In addition, since the pointer is always rectilinearly translated to indicate a measured value on the scale, the scale is easy to read. In the case of multiple scales, the scales can be correctly read without error since the scale spacing per unit of each scale is the same. Moreover, since the translational distance of the pointer per unit is increased in the vicinity of the center of the scale and therefore the scale spacing therearound is also increased, correct reading with little error can be made possible if a range considered to be frequently used is graduated in the center of the scale.

What is claimed is:

1. In a pointer device for use in a measuring apparatus, in combination:

a. a rotary shaft (6) which rotates in response to an external change;
   b. parallelogram means coupled to said rotary shaft (6) including an elongated straight first needle with inner and outer ends, said inner end being coupled to said rotary shaft extending radially therefrom so as to move in response to the rotation of said rotary shaft, an auxiliary straight second needle (7) equal in length to said first needle also with inner and outer ends, set parallel to said first needle a preset distance, a straight third needle with ends disposed between the outer ends of said first and second needles;
   c. first and second moveable bearings, holding said third needle ends to the outer ends of said first and second needles, said bearings each having a U-shaped bracket with two arms having an extremely thin twistable band stretched between said arms, a third fixed bearing of the same construction as said first and second bearing, said second straight needle inner end being connected thereto; and,
   d. scale means and pointer means coupled to said parallelogram means, said scale means being disposed adjacent said pointer means and being incremented in units corresponding to a unit value of the rotation of said shaft said pointer means outer end being disposed at right angles to said straight first needle to define said pointer means and so disposed adjacent to said scale as to move along said scale.

2. In a pointer device for use in a measuring apparatus, in combination:

a. a rotary shaft which rotates in response to an external change;
   b. parallelogram means coupled to said rotary shaft including a main needle (4) with inner and outer ends, said inner end being coupled to said rotary shaft extending radially therefrom so as to move in response to the rotation of said rotary shaft, said parallelogram means being further comprised or four serially connected auxiliary short needles (24), the outer end of said main needle being connected to the juncture (14) of two of said short auxiliary needles, two long auxiliary needles (23) connected at their outer ends to the short auxiliary needles at the junctures adjacent to said first juncture and connected at their inner ends to a fixed bearing;
   c. bearing means disposed at the ends of each of the short auxiliary needles and long auxilliary needles forming said junctures;
   d. scale means and pointer means coupled to said parallelogram means, said scale means being disposed adjacent said pointer means and being incremented in units corresponding to a unit value of the rotation of said shaft, said pointer disposed at the juncture of the short auxilliary needles which is opposite to that connected to the main needle and adjacent those connected to said long auxilliary needles.

* * * * *